United States Patent
Matsui et al.

(10) Patent No.: US 7,042,288 B2
(45) Date of Patent: May 9, 2006

(54) CHARGE AMPLIFIER FOR PIEZOELECTRIC PRESSURE SENSOR

(75) Inventors: Masayoshi Matsui, Ichinomiya (JP); Koji Okazaki, Ichinoiya (JP)

(73) Assignee: NGK Spark Plus Co., Ltd., Aichi (JP)

( * ) Notice: Subject to any disclaimer, the term of this patent is extended or adjusted under 35 U.S.C. 154(b) by 0 days.

(21) Appl. No.: 10/433,330

(22) PCT Filed: Nov. 27, 2001

(86) PCT No.: PCT/JP01/10338

§ 371 (c)(1),
(2), (4) Date: Oct. 30, 2003

(87) PCT Pub. No.: WO02/44680

PCT Pub. Date: Jun. 6, 2002

(65) Prior Publication Data

US 2004/0075498 A1    Apr. 22, 2004

(30) Foreign Application Priority Data

Dec. 1, 2000  (JP) ............................ 2000-367166

(51) Int. Cl.
H03F 1/00   (2006.01)
H03F 1/38   (2006.01)
H03F 3/04   (2006.01)

(52) U.S. Cl. .................. 330/174; 330/291; 330/302

(58) Field of Classification Search ............... 330/174, 330/291, 302
See application file for complete search history.

(56) References Cited

U.S. PATENT DOCUMENTS

| 4,543,536 A | * | 9/1985 | Pederson .................. 330/85 |
| 4,620,438 A | * | 11/1986 | Howng ..................... 73/35 |
| 5,003,827 A | * | 4/1991 | Kalinoski et al. ........ 73/861.24 |
| 5,488,872 A | | 2/1996 | McCormick |
| 5,701,101 A | | 12/1997 | Weinhardt et al. |
| 2004/0046484 A1 | * | 3/2004 | Schiller ..................... 310/317 |
| 2004/0194532 A1 | * | 10/2004 | Lally et al. .................. 73/1.82 |

FOREIGN PATENT DOCUMENTS

| JP | 60-203831 A | 10/1985 |
| JP | 63-173970 A | 7/1988 |
| JP | 01-213538 A | 8/1989 |

* cited by examiner

Primary Examiner—Patricia Nguyen
(74) Attorney, Agent, or Firm—Sughrue Mion, PLLC

(57) ABSTRACT

An object of the present invention is to provide a charge amplifier which can be operated at low cost so that electric charge generated in a piezoelectric pressure sensor having one end grounded is converted into a voltage signal.

In the charge amplifier (1) according to an embodiment of the present invention, a plus side power source input terminal of an operational amplifier (5) is connected to a plus power source (+5 V) while a minus side power source input terminal of the operational amplifier (5) is grounded, so that the operational amplifier (5) is supplied with a single power source. Further, an offset voltage lower than the plus power source voltage but higher than the ground potential is applied to a non-inverted input terminal of the operational amplifier (5). Accordingly, change of pressure in both positive and negative directions can be converted into a voltage signal with the offset voltage as its center though the operational amplifier (5) is driven by a single power source. That is, cost can be suppressed because a double power source is not required.

4 Claims, 16 Drawing Sheets

PRIOR ART

CHARGE AMPLIFIER FOR PIEZOELECTRIC PRESSURE SENSOR

TECHNICAL FIELD

The present invention relates to a charge amplifier by which electric charge generated in a piezoelectric pressure sensor having one grounded end is converted into a voltage signal.

BACKGROUND ART

A charge amplifier by which electric charge generated in a piezoelectric pressure sensor grounded to a mount target is converted into a voltage signal has been heretofore formed by use of an operational amplifier. Combustion pressure of an internal combustion engine, however, varies to both a positive value and a negative value. Therefore, there is employed a method in which the operational amplifier is operated by a double power source (having a pair of positive and negative power sources, for example, of ±5 V) to convert electric charge into a voltage signal.

For example, a charge amplifier shown in FIG. 17 is one of this type charge amplifiers. In the charge amplifier 501, an inverted input terminal of an operational amplifier 505 is connected, through a resistor 503, to the other end of a piezoelectric pressure sensor S having one end grounded to a mount target. The inverted input terminal is connected to an output terminal through a feedback capacitor 507. A feedback resistor 509 is further connected in parallel to the feedback capacitor 507. On the other hand, a non-inverted input terminal is grounded. A power source of +5 V is connected to a positive power source input terminal of the operational amplifier 505 whereas a power source of −5V is connected to a negative power source input terminal of the operational amplifier 505. The operational amplifier 505 is driven by the two power sources.

It is however general that electric power is supplied from a battery of a plus power source when combustion pressure of an internal combustion engine of an automobile needs to be measured. To use the operational amplifier by the two power sources in such a case, it is necessary to form a circuit of a minus power source from a DC-DC converter, etc. This causes increase in cost.

DISCLOSURE OF THE INVENTION

The present invention is developed with the above description as the background and an object of the present invention is to provide a charge amplifier which can be operated at low cost so that electric charge generated in a piezoelectric pressure sensor having ne end grounded is converted into a voltage signal.

In order to achieve the foregoing object, the charge amplifier according to a first configuration of the present invention is a charge amplifier for converting electric charge generated in a piezoelectric pressure sensor into a voltage signal, including: an operational amplifier having an inverted input terminal connected to the other end of the piezoelectric pressure sensor having one end grounded; and a feedback capacitor for connecting the inverted input terminal of the operational amplifier to an output terminal of the operational amplifier; wherein: the operational amplifier is driven by a single power source; and an offset voltage is applied to a non-inverted input terminal of the operational amplifier.

That is, in the charge amplifier according to the first configuration of the present invention, the operational amplifier has a plus side power source input terminal connected to a plus power source and a minus side power source input terminal grounded, so that the operational amplifier is supplied with a single power source. Further, an offset voltage lower than the plus power source voltage but higher than the ground potential is applied to the non-inverted input terminal of the operational amplifier. Accordingly, even in the case where only the single power source is supplied to the operational amplifier, the change of pressure in both positive and negative directions can be converted into a voltage signal with the offset voltage as its center. According to the charge amplifier configured thus, cost can be suppressed because a double power source is not required.

When here is the piezoelectric pressure sensor placed in such a bad environment that the piezoelectric pressure sensor is attached, for example, to an internal combustion engine of an automobile and used for detecting in-cylinder pressure, insulation resistance of the piezoelectric pressure sensor, that is, resistance between opposite ends of the piezoelectric pressure sensor may be reduced. In such a case, the output signal of the charge amplifier may cling to the power source voltage because of the influence of a leakage current generated by reduction in insulation resistance, so that the charge amplifier may malfunction.

Therefore, according to a second configuration of the present invention, a coupling capacitor may be preferably provided between the inverted input terminal of the operational amplifier and the other terminal (the terminal opposite to the grounded terminal) of the piezoelectric pressure sensor. In this configuration, even in the case where insulation resistance of the piezoelectric pressure sensor is reduced, the output signal of the charge amplifier can be restrained from clinging to the power source voltage because of the influence of the leakage current.

In this case, a higher effect is exhibited on suppression of the leakage current as capacitance of the coupling capacitor increases. Therefore, according to a third configuration of the present invention, a capacitor having capacitance of not lower than capacitance of the piezoelectric pressure sensor may be preferably used as the coupling capacitor. A response lag, however, occurs in the charge amplifier when the capacitance is made high. It is therefore preferable that the capacitance of the coupling capacitor is not higher than 10 μF on the assumption that the response time is from 1 second to 2 seconds in practical use.

Incidentally, when the ground potential on the piezoelectric pressure sensor side is displaced from the ground potential on the charge amplifier side, error occurs in the output signal of the charge amplifier. Therefore, according to a fourth configuration of the present invention, a lead wire may be preferably provided for electrically connecting the grounded end of the piezoelectric pressure sensor to a ground terminal of the charge amplifier in order to make the ground potential on the piezoelectric pressure sensor side coincident with the ground potential on the charge amplifier side.

In this configuration, the potential difference between the ground potential on the piezoelectric pressure sensor side and the ground potential on the charge amplifier side can be suppressed to improve the accuracy of the output signal of the charge amplifier.

According to a fifth configuration of the present invention, an amplifier (of a so-called FET input type) using an FET as an input portion may be preferably used as the operational amplifier. In this configuration, input impedance of the operational amplifier becomes so high that electric charge generated in the piezoelectric pressure sensor can be surely converted into a voltage signal.

Incidentally, when the charge amplifier according to (any one of the first to fifth configurations of) the present invention is applied to a piezoelectric pressure sensor for detecting in-cylinder pressure of an internal combustion engine on the basis of change of clamping load of a spark plug detected by a piezoelectric element provided on a mount seat of the spark plug, a high effect is exhibited. That is, in an automobile, because electric power supply is generally performed from a battery of a plus power source, the charge amplifier according to the first configuration of the present invention is fit to use. Further, because such a piezoelectric pressure sensor is placed in such a bad environment that insulation resistance of the piezoelectric pressure sensor is apt to be reduced, the charge amplifier according to the second configuration of the present invention is fit to use.

Figure 1:
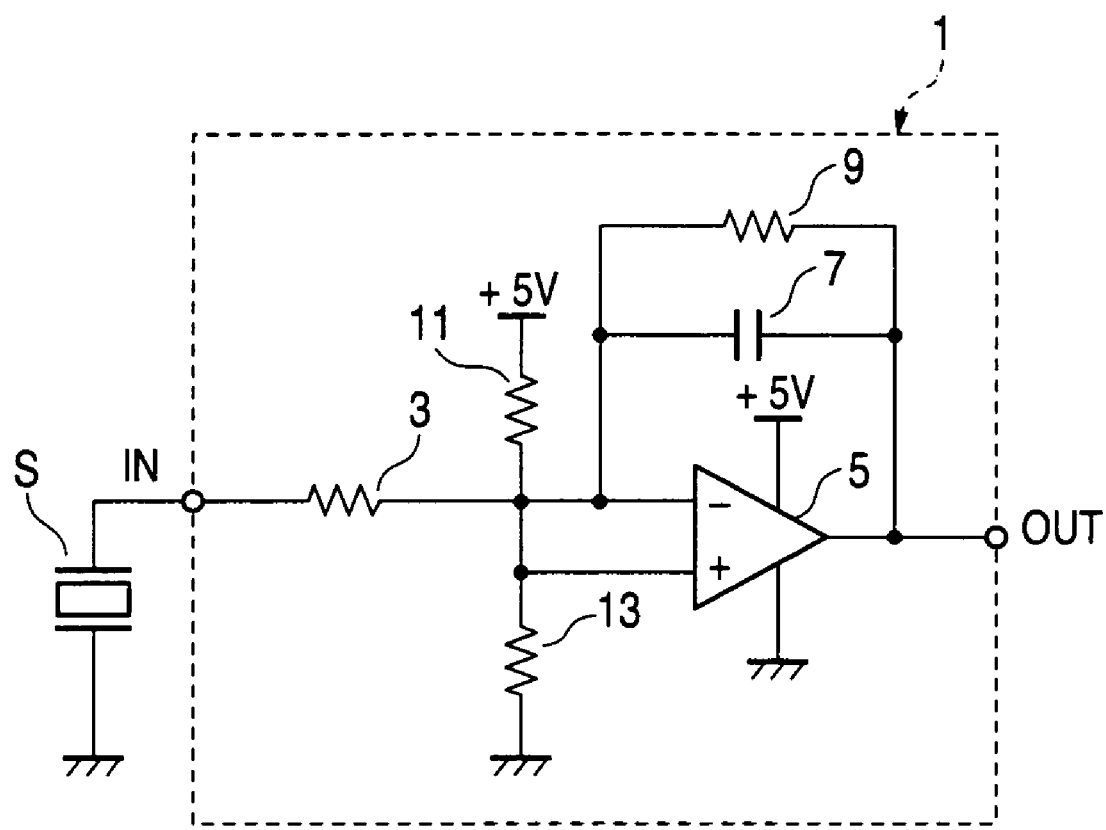
FIG. 1 is an electric circuit diagram showing a charge amplifier according to a first embodiment.

Incidentally, in the drawings, the reference numeral (symbol) 1 or 101 designates a charge amplifier; 5, an operational amplifier; 7, a feedback capacitor; 21, an internal combustion engine; 23, a spark plug; 23a, a metal shell; 23b, an utput cable; 25, a combustion chamber; 103, a coupling capacitor; and S or S', a piezoelectric pressure sensor.

BEST MODE FOR CARRYING OUT THE INVENTION

Embodiments of the present invention will be described below with reference to the drawings.

FIG. 1 shows a charge amplifier 1 as a first embodiment for converting combustion pressure in an internal combustion engine into an electric signal. Incidentally, the charge amplifier 1 is formed in the inside of an engine control unit (ECU) 27 which will be described later.

As shown in FIG. 1, one end of a piezoelectric pressure sensor S is grounded. An inverted input terminal of an operational amplifier 5 is connected to the other end of the piezoelectric pressure sensor S through an input terminal in of the charge amplifier 1 and a resistor 3. An FET is used as an input portion of the operational amplifier 5.

An output terminal of the operational amplifier 5 is connected to the inverted input terminal of the operational amplifier 5 through a feedback capacitor 7. A feedback resistor 9 is connected in parallel to the feedback capacitor 7. The feedback resistor 9 is provided for suppressing the temperature drift of a piezoelectric element.

A non-inverted input terminal of the operational amplifier 5 is connected to a power source of +5 V through a resistor 11 and grounded through a resistor 13. That is, the power source voltage is divided by the series-connected resistors 11 and 13, so that a tap voltage is applied as an offset voltage to the non-inverted input terminal. The output terminal of the operational amplifier 5 is further connected to an output terminal out of the charge amplifier 1.

In the charge amplifier 1, the operational amplifier 5 is used so as to be operated by a single power source. The power source of +5V is connected to a plus power source input terminal of the operational amplifier 5 with respect to which a minus power source input terminal is grounded.

Figure 2:
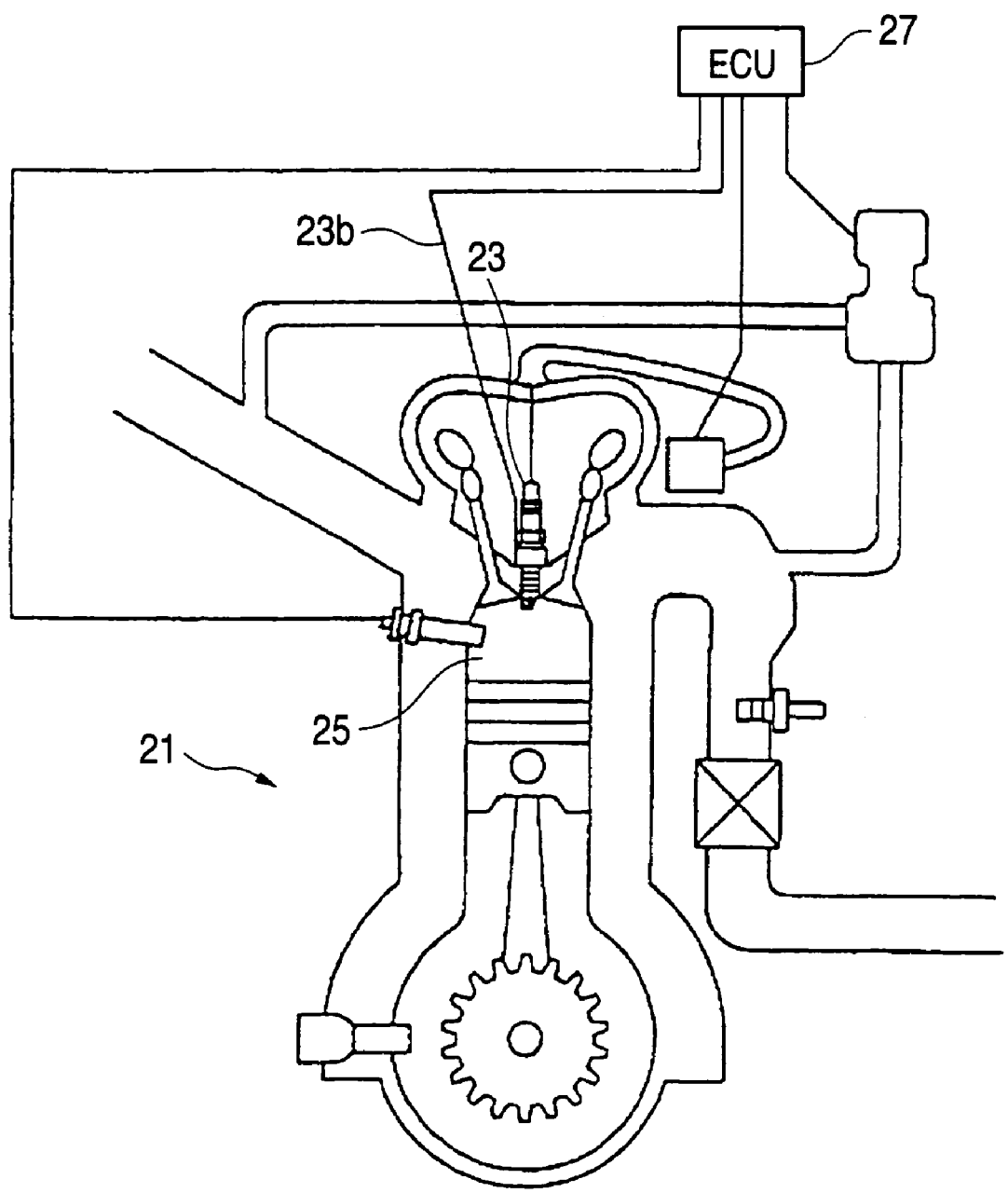
FIG. 2 is an explanatory diagram showing the form of use of a piezoelectric pressure sensor.
Figure 3:
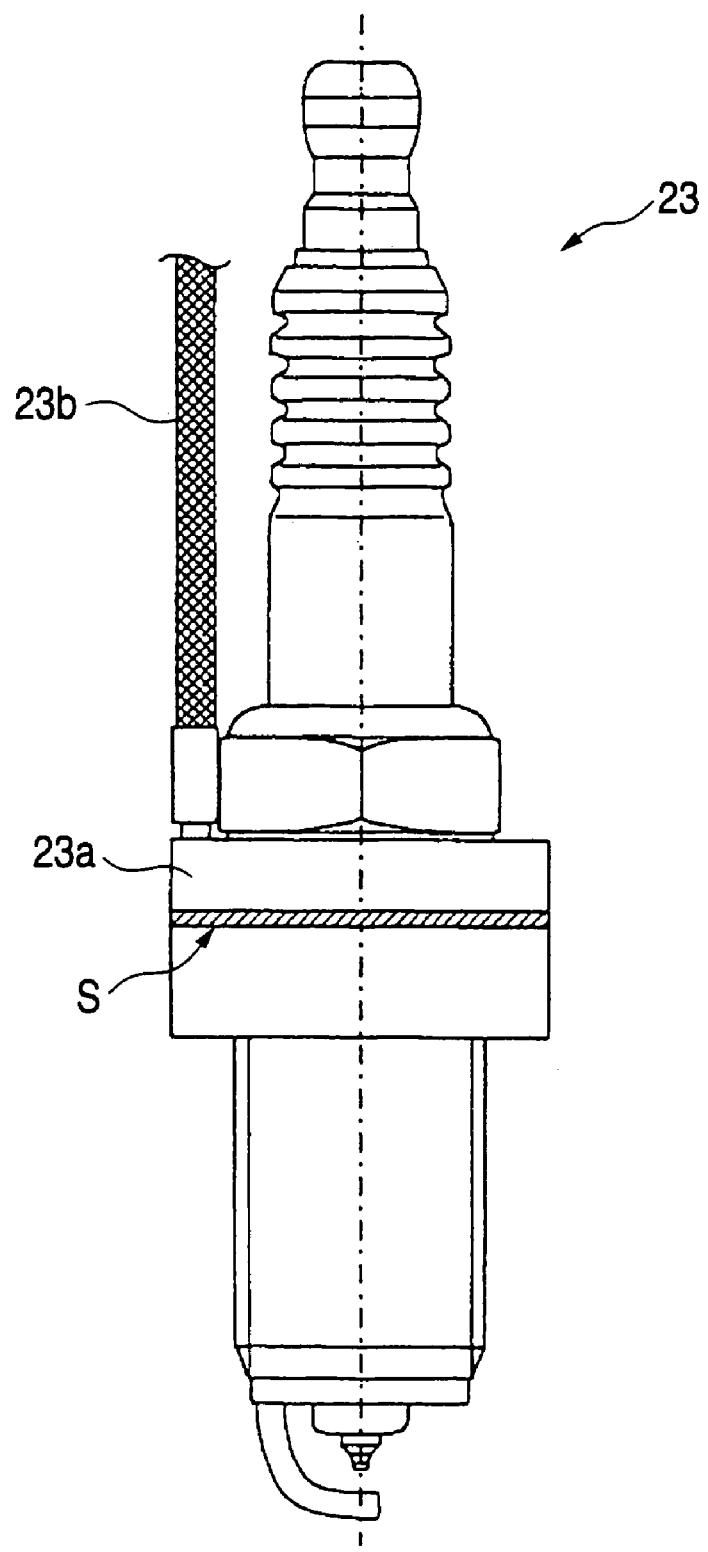
FIG. 3 is an explanatory diagram showing a spark plug having a built-in piezoelectric pressure sensor.

As shown in FIGS. 2 and 3, the piezoelectric pressure sensor S is provided on a mount seat of a spark plug 23 of an internal combustion engine 21 and detects change of clamping load of the spark plug 23 in the internal combustion engine 21 to thereby detect internal pressure of a combustion chamber 25 (i.e., in-cylinder pressure) of the internal combustion engine 21.

As shown in FIG. 3, the spark plug 23 has a metal shell 23a which has a thread portion formed for attaching the spark plug 23 to a body of the internal combustion engine 21. The metal shell 23a is a mount seat of the spark plug 23. The spark plug 23 is fastened to the body of the internal combustion engine 21 through the metal shell 23a.

The piezoelectric pressure sensor S, which is built in the inside of the metal shell 23a, outputs electric charge corresponding to clamping load of the spark plug 23 which varies according to change of the in-cylinder pressure, that is, electric charge generated in accordance with the in-cylinder pressure, through an output cable 23b. That is, in this embodiment, the piezoelectric pressure sensor S is a so-called plug-integrated pressure sensor (PGPS) which is integrally provided on the sparkplug 23. Incidentally, the piezoelectric element forming the piezoelectric pressure sensor S is made of $PbTiO_3$.

The piezoelectric pressure sensor S has one end grounded to the body of the internal combustion engine 21 through the metal shell 23a, and the other end connected to the input terminal in of the charge amplifier 1 in the engine control unit (ECU) 27 through the output cable 23b. Incidentally, the output cable 23b includes a lead wire for outputting generated electric charge, and a lead wire for connecting an electrode grounded to the body of the internal combustion engine 21 and the ground of the ECU 27 (e.g., a housing of the ECU 27) to each other.

In this manner, in the charge amplifier 1 according to this embodiment, the plus side power source input terminal of the operational amplifier 5 is connected to the plus power source (+5 V) while the minus side power source input terminal of the operational amplifier 5 is grounded, so that the operational amplifier 5 is supplied with a single power source. Further, an offset voltage lower than the plus power source voltage but higher than the ground potential is applied to the non-inverted input terminal of the operational amplifier 5. Accordingly, change of pressure in both positive and negative directions can be converted into a voltage signal with the off set voltage as its center though the operational amplifier 5 is driven by a single power source. That is, according to the charge amplifier 1 configured thus, cost can be suppressed because a double power source is not required.

Furthermore, because the grounded end of the piezoelectric pressure sensor S is connected to the ground on the charge amplifier side through the lead wire forming the output cable 23b, the potential difference between the ground potential on the piezoelectric pressure sensor side and the ground potential on the charge amplifier side is suppressed to improve the accuracy of the output signal of the charge amplifier 1.

Furthermore, because an FET input type amplifier is used as the operational amplifier 5, electric charge generated in the piezoelectric pressure sensor S can be surely converted into a voltage signal.

Next, a second embodiment of the present invention will be described.

Figure 4:
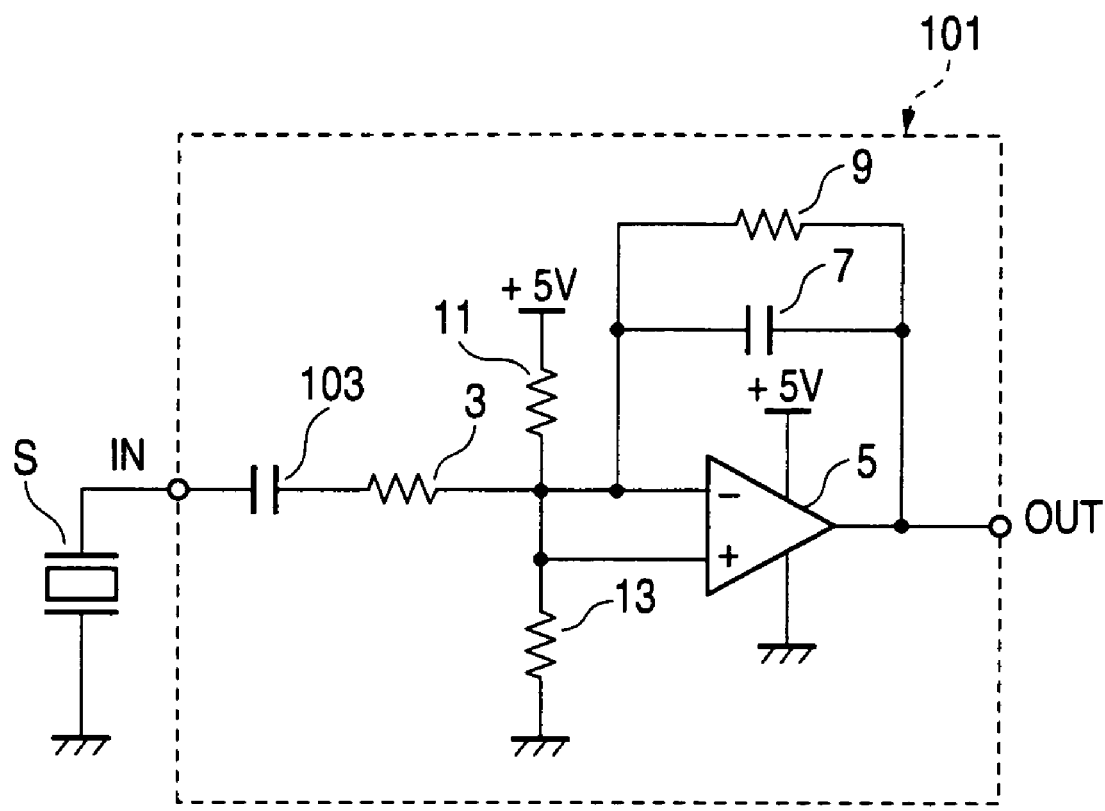
FIG. 4 is an electric circuit diagram showing the charge amplifier according to a second embodiment.

FIG. 4 shows a charge amplifier 101 as a second embodiment. The charge amplifier 101 is configured 80 that a coupling capacitor 103 is provided between the inverted input terminal of the operational amplifier 5 and the piezoelectric pressure sensor S in addition to the charge amplifier 1 according to the first embodiment. That is, the coupling capacitor 103 is provided so as to be series-connected to the resistor 3 which is provided between the inverted input terminal of the operational amplifier 5 and the piezoelectric pressure sensor S. Incidentally, because this embodiment is the same as the charge amplifier 1 according to the first embodiment except the aforementioned point, description will be omitted.

Incidentally, when the piezoelectric pressure sensor S is placed in such a bad environment that the piezoelectric pressure sensor S is attached to the internal combustion engine 21 of the automobile and used for detecting the in-cylinder pressure thereof as in this embodiment, insulation resistance of the piezoelectric pressure sensor S, that is, resistance between opposite electrodes of the piezoelectric pressure sensor S may be reduced temporarily. In such a case, a leakage current is generated toward the piezoelectric pressure sensor S side through the resistor 3 and the input terminal in. Because a relation called virtual short circuit is established between the inverted input terminal and the non-inverted input terminal, the output signal of the charge amplifier is raised by the influence of the leakage current and may cling to the power source voltage finally to make the charge amplifier malfunction.

Therefore, in the charge amplifier 101 according to this embodiment, the coupling capacitor 103 is provided between the inverted input terminal of the operational amplifier 5 and the piezoelectric pressure sensor S. Accordingly, even in the case where insulation resistance of the piezoelectric pressure sensor S (i.e., insulation resistance between the opposite electrode terminals) is reduced, the leakage current can be suppressed so that the output signal of the charge amplifier 101 can be restrained from increasing because of the influence of the leakage current.

Incidentally, it is preferable that capacitance of the coupling capacitor 103 is not lower than capacitance of the piezoelectric pressure sensor S. This is effective in suppressing the leakage current. In the charge amplifier 101 according to the second embodiment, the operational amplifier 5 operates so that the potential at the inverted input terminal becomes equal to the potential at the non-inverted input terminal when the power source is switched on. When the coupling capacitor 103 is provided, it is however necessary to charge the coupling capacitor 103 through the resistor R9. Accordingly, if capacitance of the coupling capacitor is made high, a response lag occurs in the charge amplifier. It is therefore preferable that capacitance of the coupling capacitor 103 is not higher than 10 µF on the assumption that the response time is from 1 second to 2 seconds in practical use.

A result of an experiment performed for confirming the effect of the charge amplifier 101 according to this embodiment will be described below.

Figure 5:
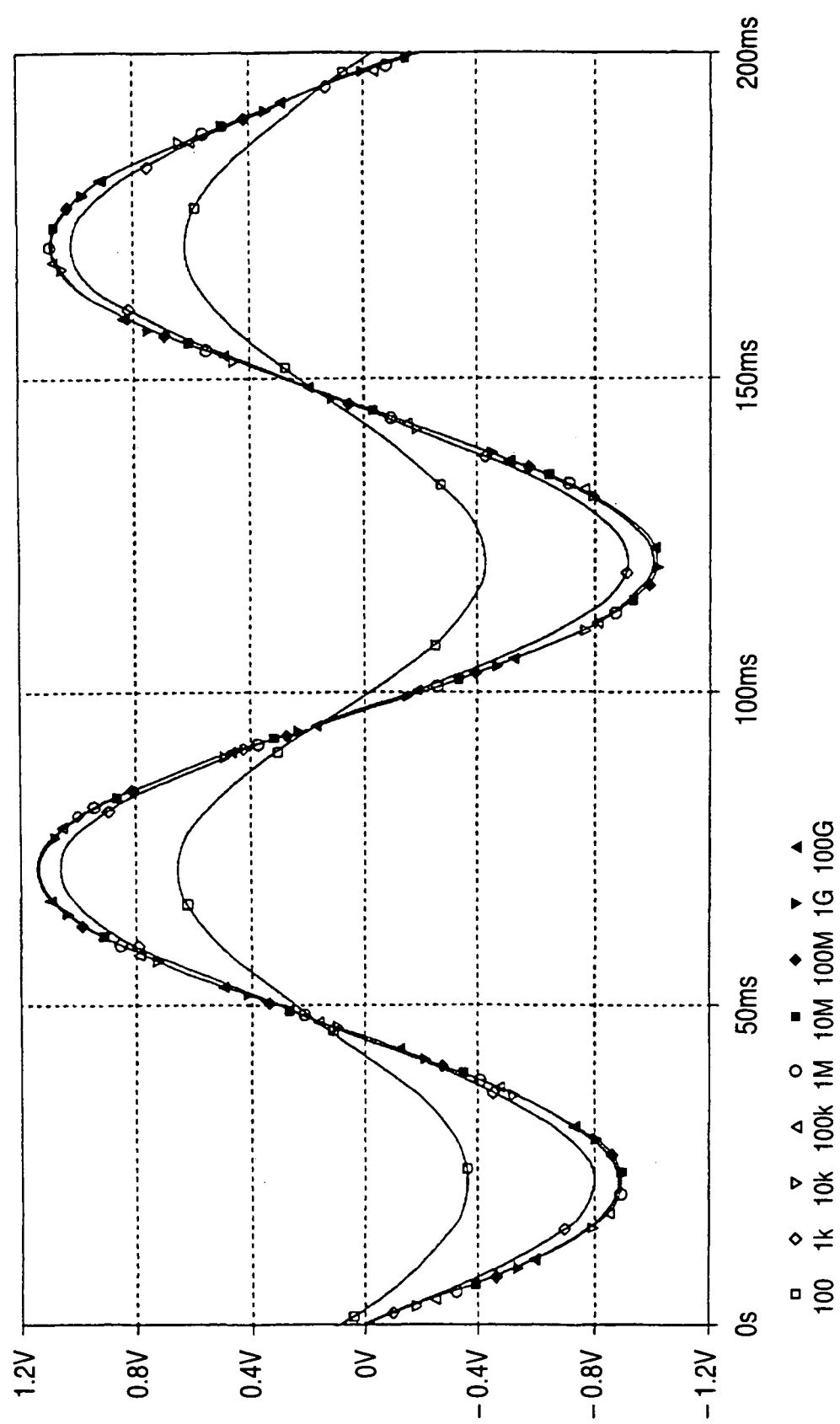
FIG. 5 is an explanatory graph showing the output waveform of a conventional charge amplifier according to insulation resistance of the piezoelectric pressure sensor.
Figure 6:
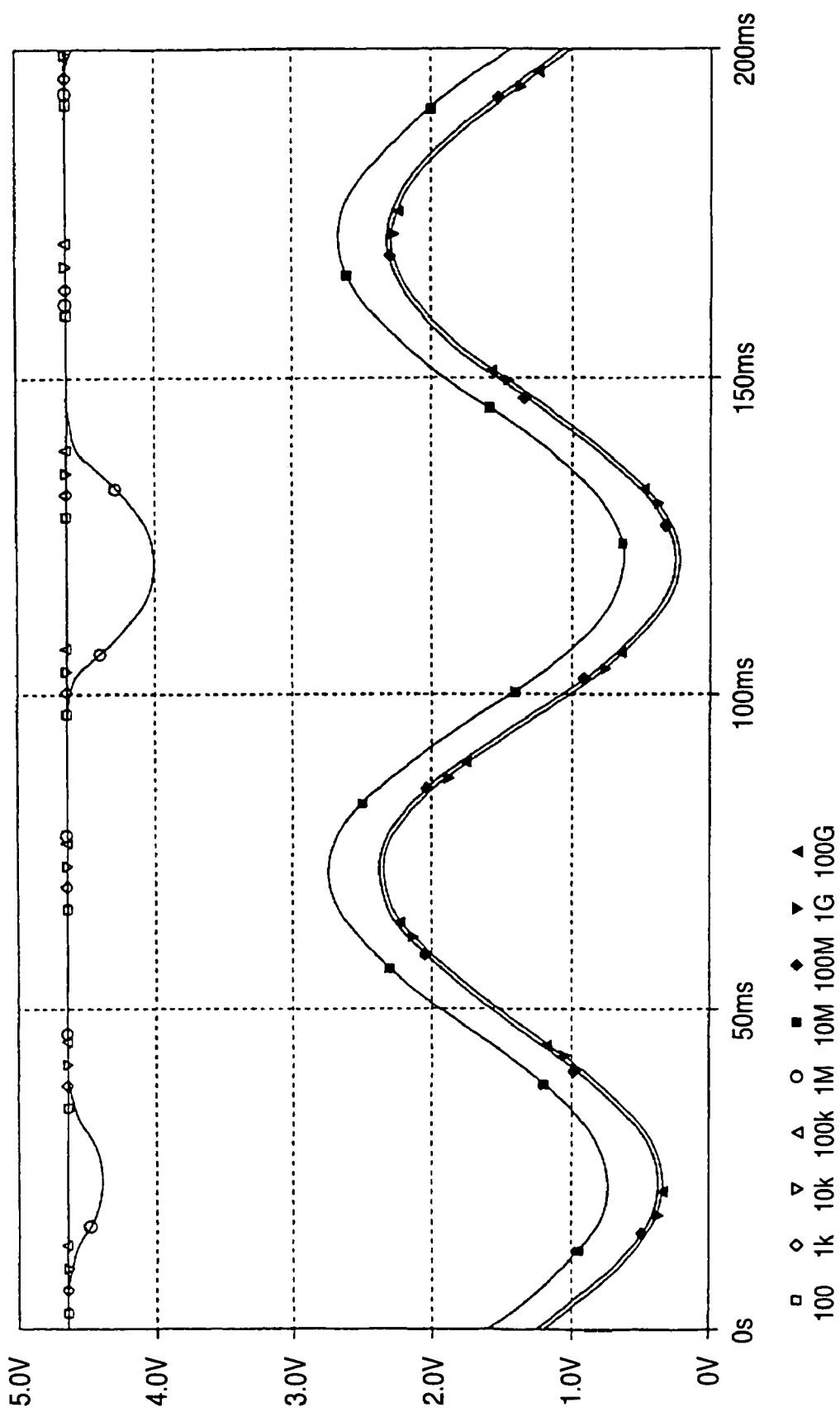
FIG. 6 is an explanatory graph showing the output waveform of the charge amplifier according to the first embodiment.
Figure 7:
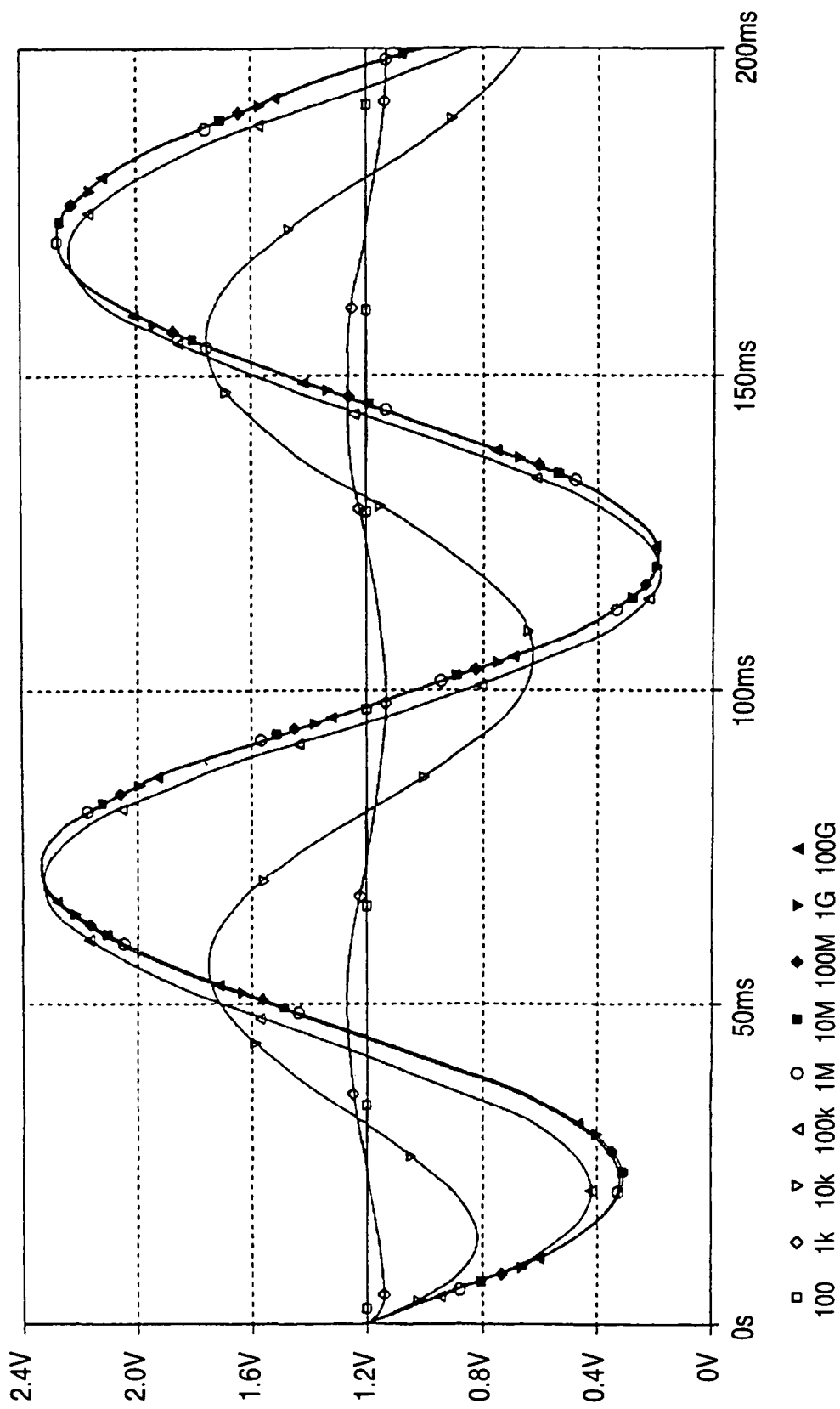
FIG. 7 is an explanatory graph showing the output waveform of the charge amplifier according to the second embodiment in the case where capacitance of the coupling capacitor is selected to be 1 µF.
Figure 8:
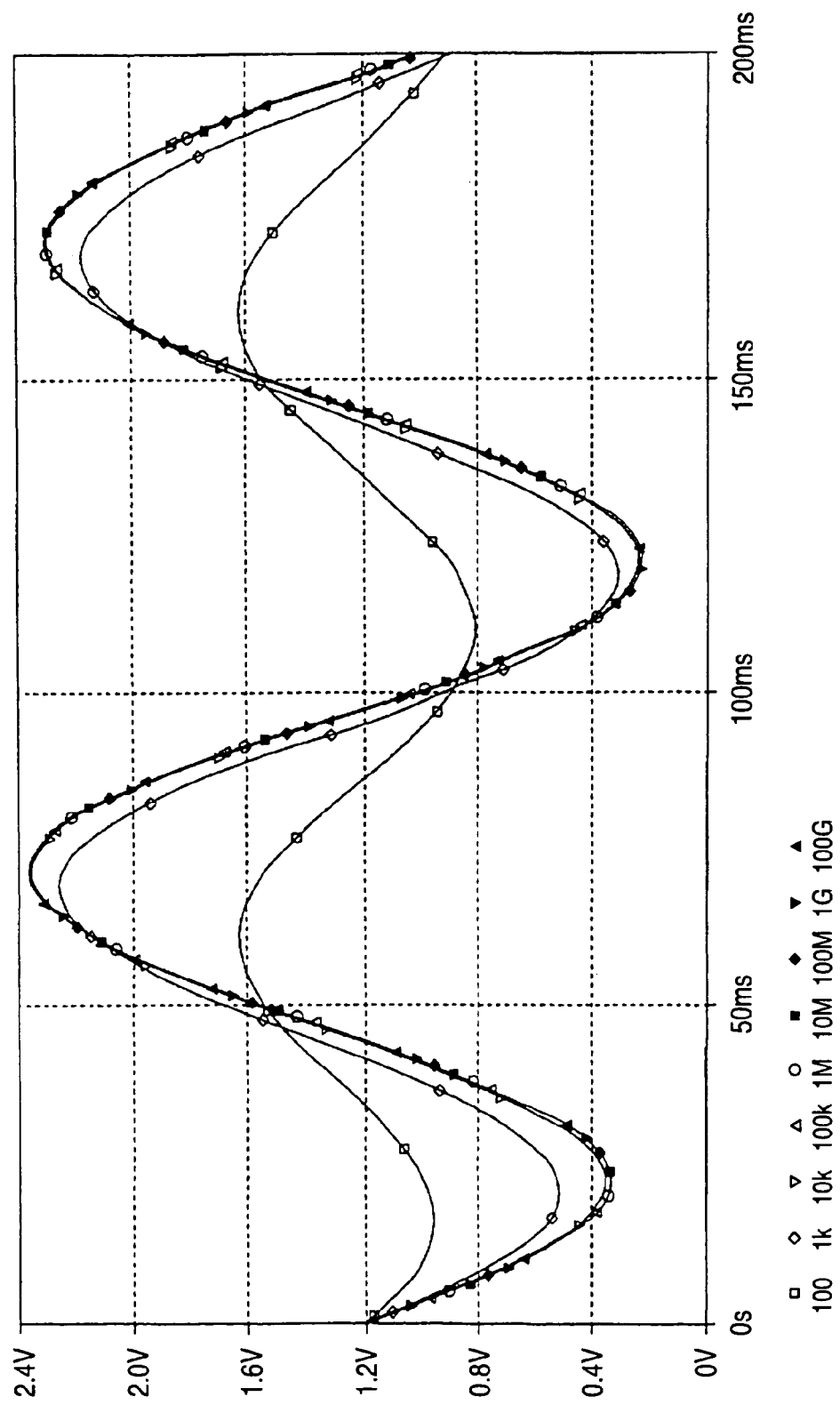
FIG. 8 is an explanatory graph showing the output waveform of the charge amplifier according to the second embodiment in the case where capacitance of the coupling capacitor is selected to be 100 µF.

FIG. 5 is a graph showing a result of examination of a signal output from the output terminal out of the conventional charge amplifier 501 with respect to each resistance value of the piezoelectric pressure sensor S in the case where an input signal constant in both frequency and amplitude is input into the input terminal in of the conventional charge amplifier 501 while insulation resistance of the piezoelectric pressure sensor S is changed stepwise from 1 GΩ to 100 Ω. FIG. 6 is a graph showing a result of the experiment performed likewise on the charge amplifier 1 according to the first embodiment. FIGS. 7 and 8 are graphs showing results of the experiment performed likewise on the charge amplifier 101 according to the second embodiment in the case where capacitance of the coupling capacitor 103 is set at 1 µF (FIG. 7) and 100 µF (FIG. 8) respectively.

Figure 9:
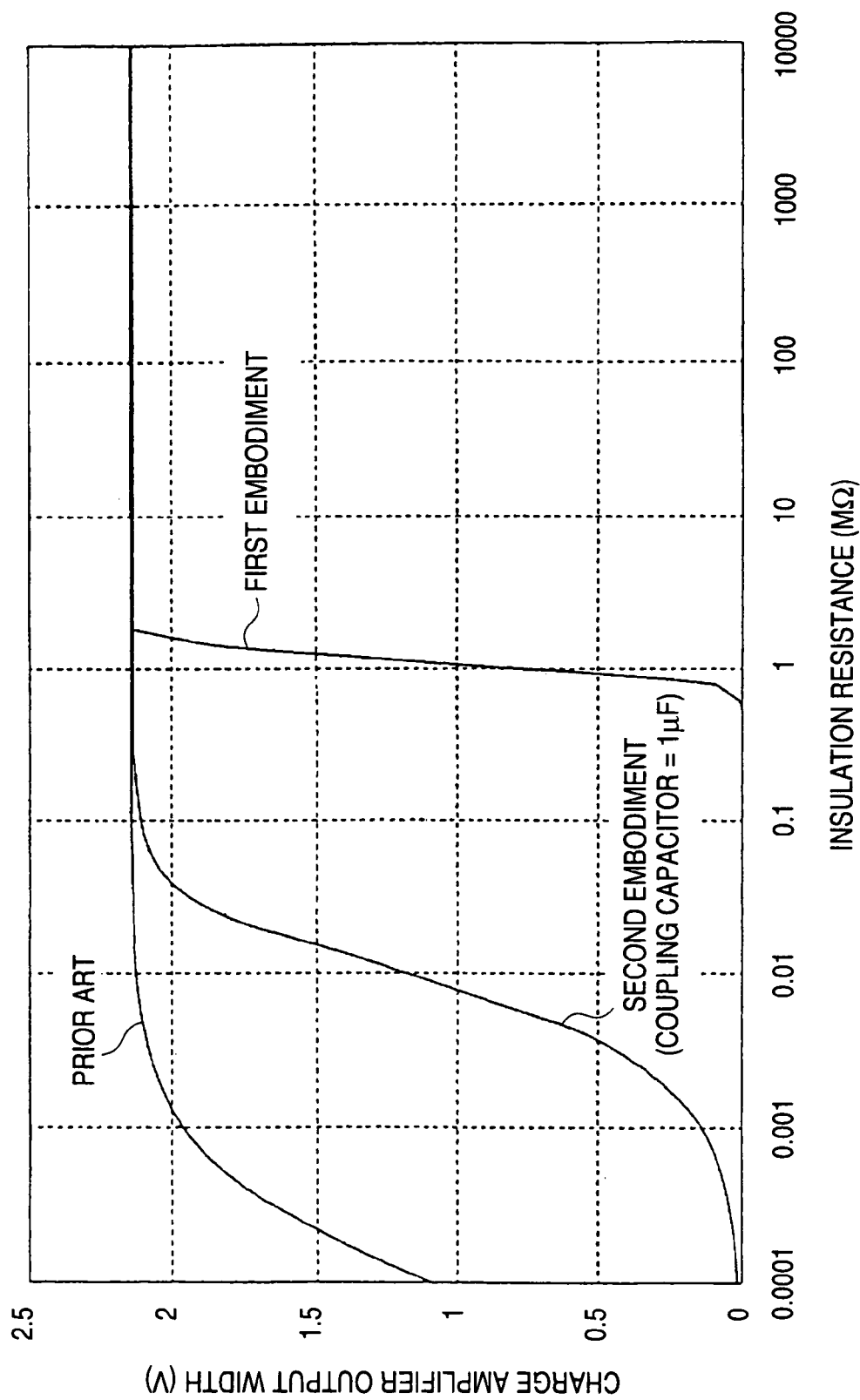
FIG. 9 is a graph showing the relation between the amplitude of the output waveform of the charge amplifier and the insulation resistance of the piezoelectric pressure sensor.

Incidentally, FIG. 9 is a graph showing the relation between the insulation resistance of the piezoelectric pressure sensor S and the output width (i.e., the amplitude of an output signal) of the charge amplifier in each of cases of the charge amplifier 501 according to the "prior art", the charge amplifier 1 according to the "first embodiment", and the charge amplifier 101 with the coupling capacitor 103 having capacitance of 1 µF according to the "second embodiment".

As shown in FIG. 5, in the case of the charge amplifier 501 according to the prior art, it is found that the output signal is little influenced even in the case where the insulation resistance is reduced to about 10 kΩ.

Next, as shown in FIG. 6, in the case of the charge amplifier 1 according to the first embodiment, increase in the output signal is confirmed (but there is little influence on the amplitude of the output signal as also shown in FIG. 9) when the insulation resistance of the piezoelectric pressure sensor S reaches 10 MΩ and it is found that the output signal almost clings to the power source voltage in a region of not higher than 1 MΩ.

Further, as shown in FIG. 7, in the case of the charge amplifier 101 with the coupling capacitor 103 having capacitance of 1 µF according to the second embodiment, there is no lift of the output signal in spite of a single power source. It is obvious that there is little problem in the output result even in the case where the insulation resistance is reduced to about 1 MΩ. Furthermore, even in the case where the insulation resistance is reduced to 100 kΩ, there is little serious problem though the magnitude of the amplitude of the output signal is slightly small. In addition, it is confirmed that the amplitude is reduced when the insulation resistance is in a range of not higher than this value.

Further, as shown in FIG. 8, in the case of the charge amplifier 101 with the coupling capacitor 103 of 100 µF according to the second embodiment, basically the same result as in FIG. 7 is obtained but it is found that the region in which reduction in amplitude occurs shifts to the low resistance side. Specifically, even reduction in insulation resistance to 10 kΩ has little influence on the amplitude of the output signal.

Accordingly, it is found that the influence of reduction in insulation resistance on the output signal can be suppressed as capacitance of the coupling capacitor 103 provided between the inverted input terminal of the operational amplifier 5 and the piezoelectric pressure sensor S increases. For the aforementioned reason about the response time, 10 µF or lower is however regarded as suitable.

Figure 10:
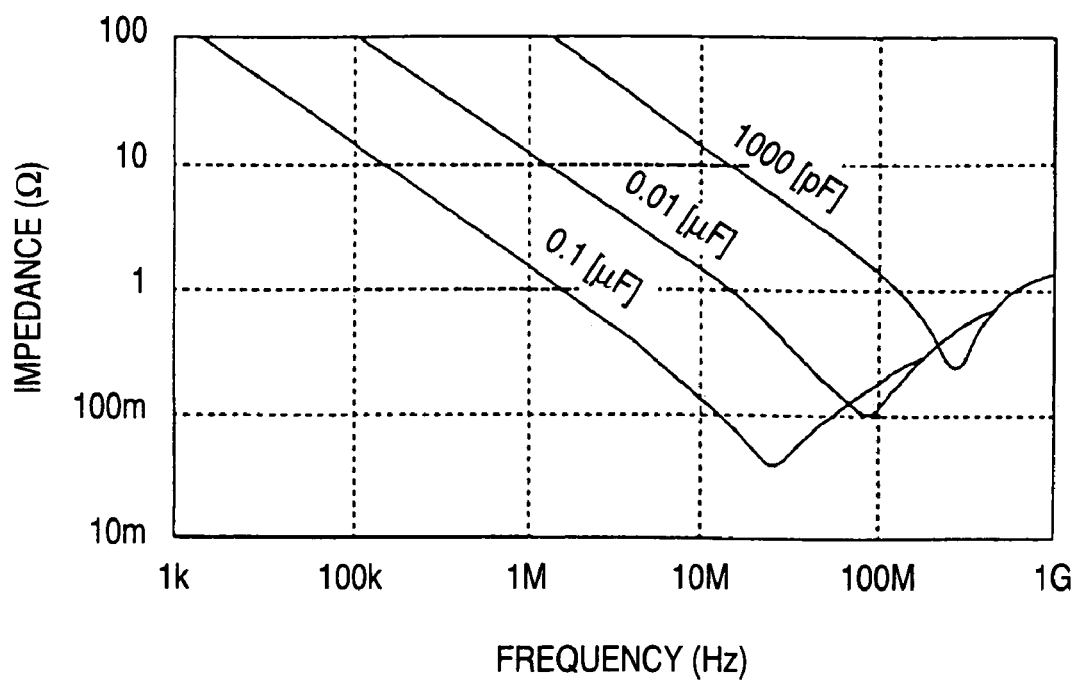
FIG. 10 is a graph showing impedance-frequency characteristic of each ceramic capacitor.
Figure 11:
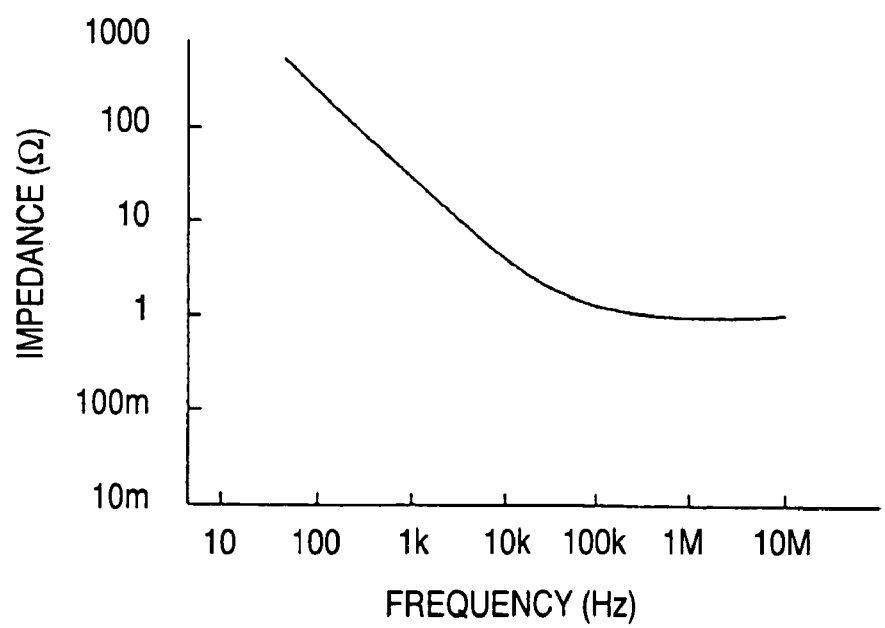
FIG. 11 is a graph showing impedance-frequency characteristic of an electrolytic capacitor.

Incidentally, a ceramic capacitor is used as the coupling capacitor 103. Alternatively, an electrolytic capacitor may be used as the coupling capacitor 103. FIG. 10 is a graph showing an example of impedance-frequency characteristic of the ceramic capacitor. FIG. 11 is a graph showing an example of impedance-frequency characteristic of the electrolytic capacitor.

Figure 12:
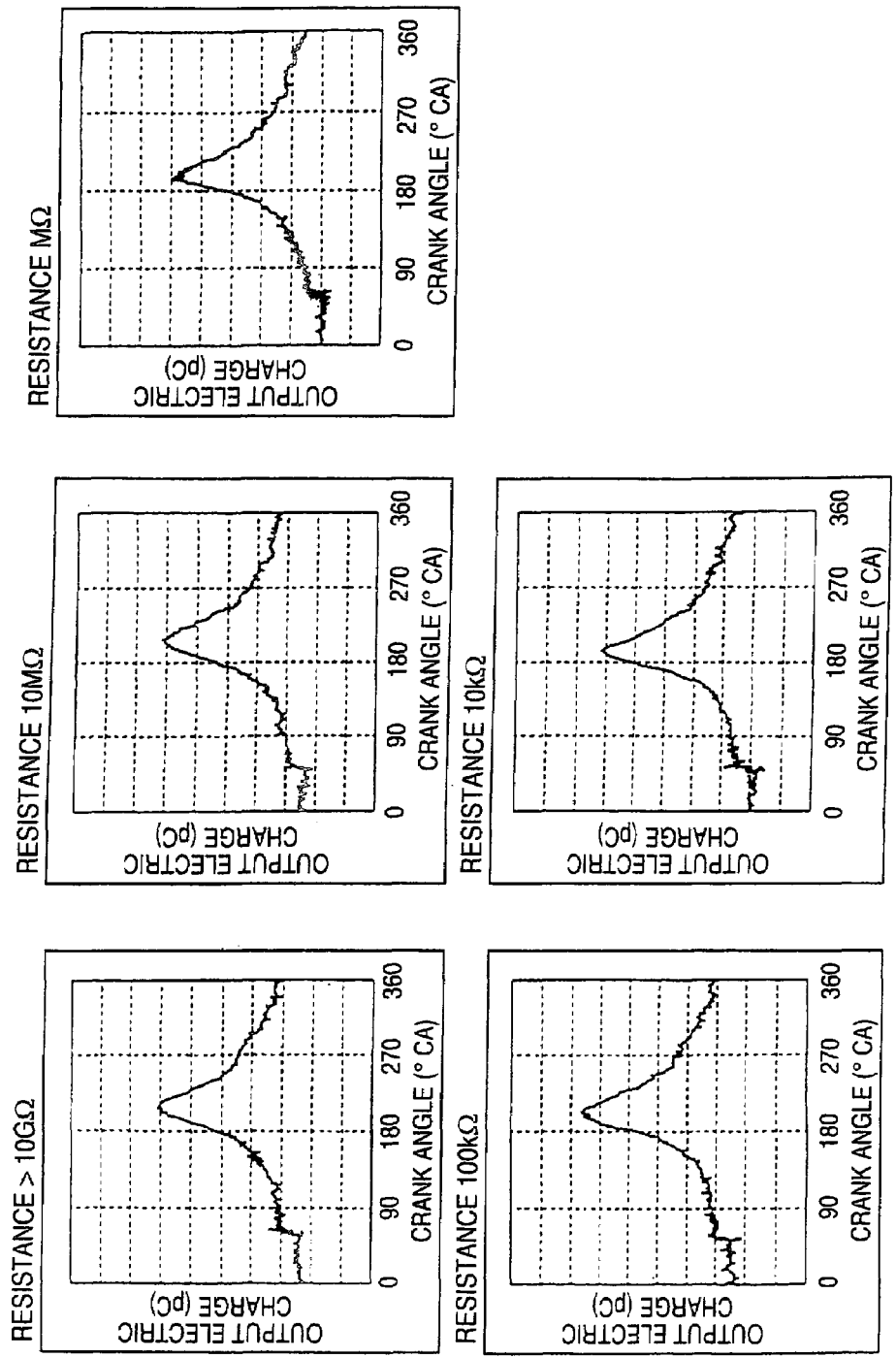
FIG. 12 is an explanatory graph showing the combustion waveform of an internal combustion engine obtained through the conventional charge amplifier.
Figure 13:
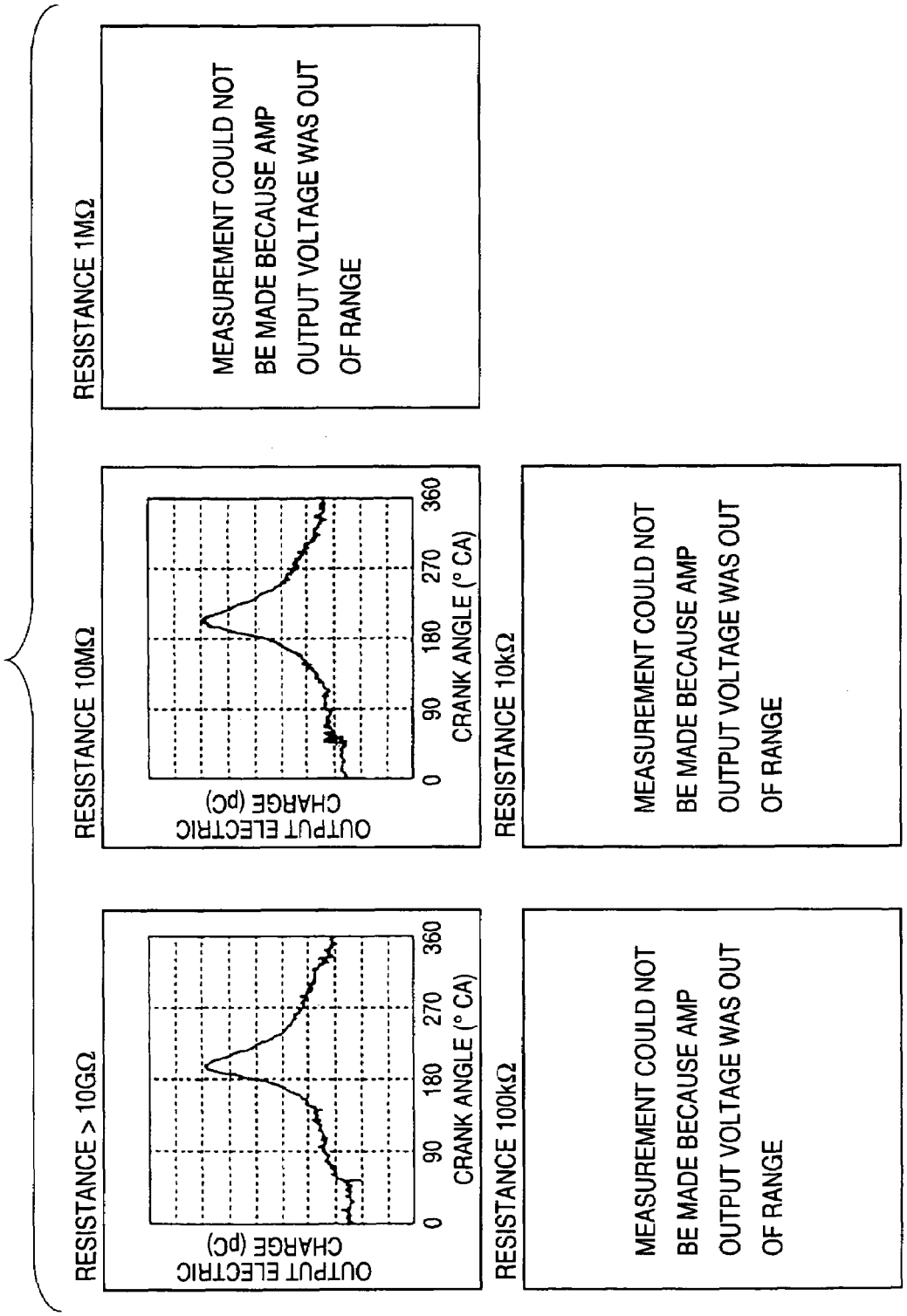
FIG. 13 is an explanatory graph showing the combustion waveform of an internal combustion engine obtained through the charge amplifier according to the first embodiment.
Figure 14:
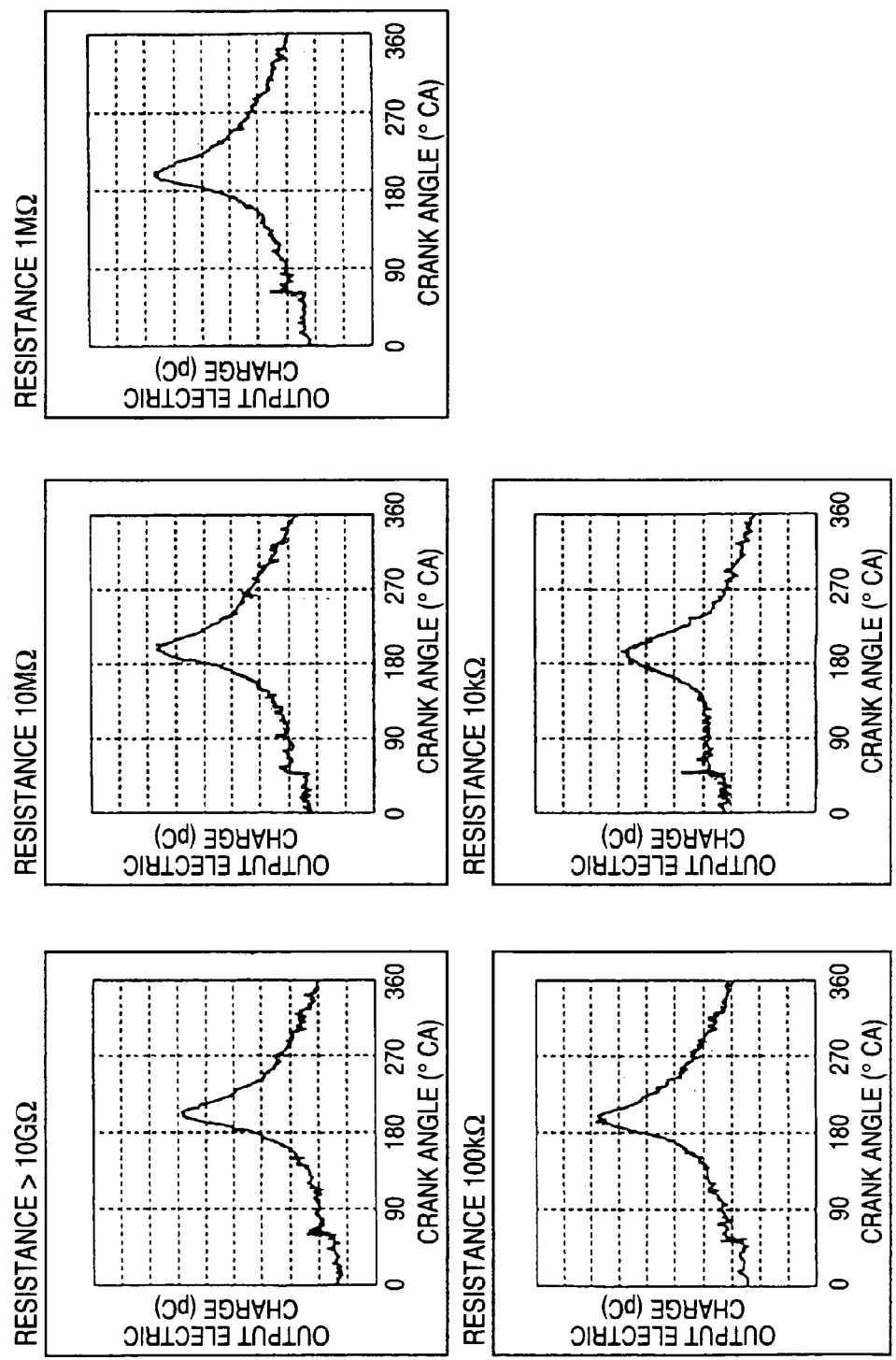
FIG. 14 is an explanatory graph showing the combustion waveform of an internal combustion engine obtained through the charge amplifier according to the second embodiment.

Next, FIGS. 12 to 14 are graphs showing combustion waveforms obtained by measurement of the in-cylinder pressure of the internal combustion engine 21. The measurement of the in-cylinder pressure is performed with respect to each resistance value in the case where the resistance value between the pposite electrodes (i.e., insulation resistance) of the piezoelectric pressure sensor S is changed stepwise from 10 GΩ to 100 Ω. Of these drawings, FIG. 12 partially extractively shows results of measurement in use of the charge amplifier 501 according to the prior art; FIG. 13 partially extractively shows results of measurement in use of the charge amplifier 1 according to the first embodiment; and FIG. 14 partially extractively shows results of measurement in use of the charge amplifier 101 according to the second embodiment in the case where a 1 µF ceramic capacitor is used as the coupling capacitor 103. In FIGS. 12 to 14, each of the vertical axes expresses the output signal of the charge amplifier in terms of output electric charge generated in the piezoelectric pressure sensor S. One degree in the vertical axis is equivalent to 1000 pC. Further, FIG. 15 shows peak values of the combustion waveforms depicted in FIGS. 12 to 14.

Figure 15:
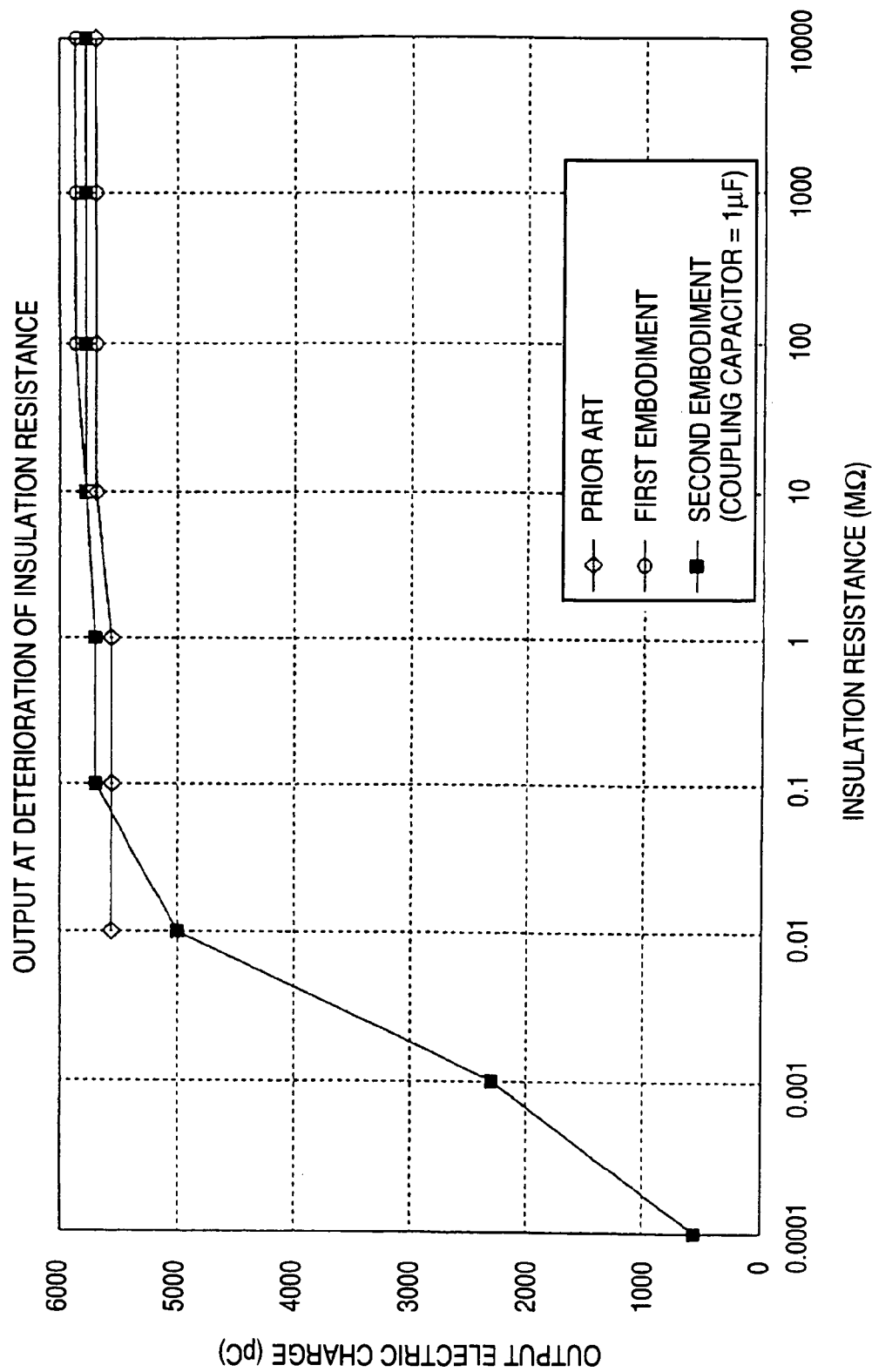
FIG. 15 is a graph showing the relation between a peak value of the combustion waveform and the insulation resistance of the piezoelectric pressure sensor.

As shown in FIGS. 12 and 15, in the case of the charge amplifier 501 according to the prior art, the output result was almost unchanged and good when insulation resistance of the piezoelectric pressure sensor S was reduced to a value of not lower than about 10 kΩ, but the output signal clung to the minus power source voltage (−5 V) to make the measurement impossible when the insulation resistance was reduced to 1 kΩ.

Further, as shown in FIGS. 13 and 15, in the case of the charge amplifier 1 according to the first embodiment, the output result was almost unchanged and good when insulation resistance of the piezoelectric pressure sensor S was reduced to a value of not lower than about 10 MΩ, but the output signal clung to the plus power source voltage (+5 V) to make the measurement impossible when the insulation resistance was reduced to 1 MΩ.

On the other hand, as shown in FIGS. 14 and 15, in the case of the charge amplifier 101 with the coupling capacitor 103 of 1 µF according to the second embodiment, the output result was almost unchanged without any problem when insulation resistance of the piezoelectric pressure sensor S was reduced to a value of not lower than about 100 kΩ.

As described above, the charge amplifier 101 according to the second embodiment can be operated by a single power source. Furthermore, because the charge amplifier 101 has the coupling capacitor 103 provided between the inverted input terminal of the operational amplifier 5 and the piezoelectric pressure sensor S, the combustion waveform can be measured as well as in the conventional charge amplifier 501 even in the case where insulation resistance of the piezoelectric pressure sensor S (insulation resistance between the opposite electrode terminals thereof) is reduced.

INDUSTRIAL APPLICABILITY

Although an embodiment of the present invention has been described above, the present invention is not limited to the aforementioned embodiments but can include various embodiments.

For example, though the embodiments have been described upon the case where the piezoelectric element of the piezoelectric pressure sensor S is made of $PbTiO_3$, there is no limit thereto. The charge amplifier according to the present invention can be also applied to a piezoelectric pressure sensor having a piezoelectric element containing other components such as $BaTiO_3$, $LiTaO_3$, $Pb(Zr-Ti)O_3$, $PbNb_2O_6$, $LiNbO_3$, $GaPC_4$, etc.

Although the embodiments have been described upon the case where the feedback resistor 9 is connected in parallel to the feedback capacitor 7, there is no limit thereto. For example, a switch for connecting and disconnecting the opposite ends of the feedback capacitor 7 may be provided instead of the feedback resistor 9.

Figure 16:
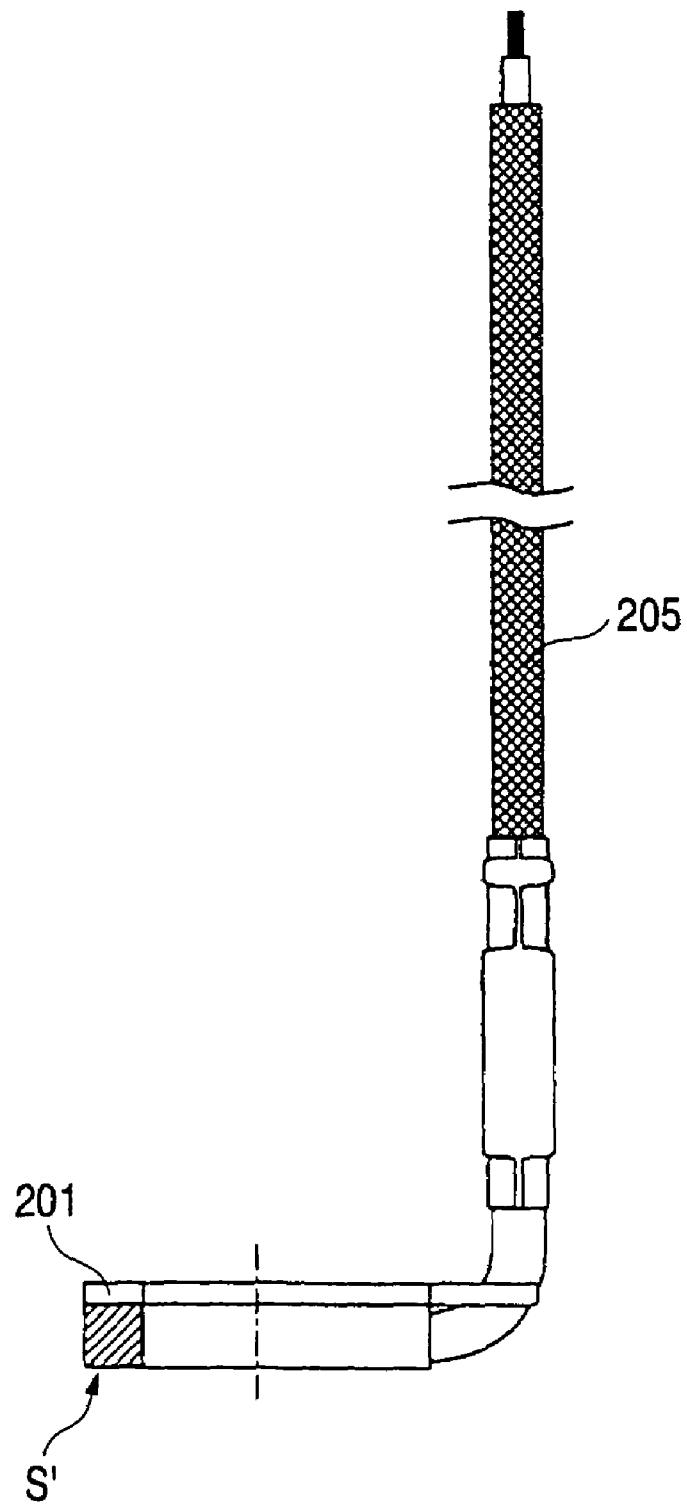
FIG. 16 is an explanatory diagram showing the piezoelectric pressure sensor as a modified example.
Figure 17:
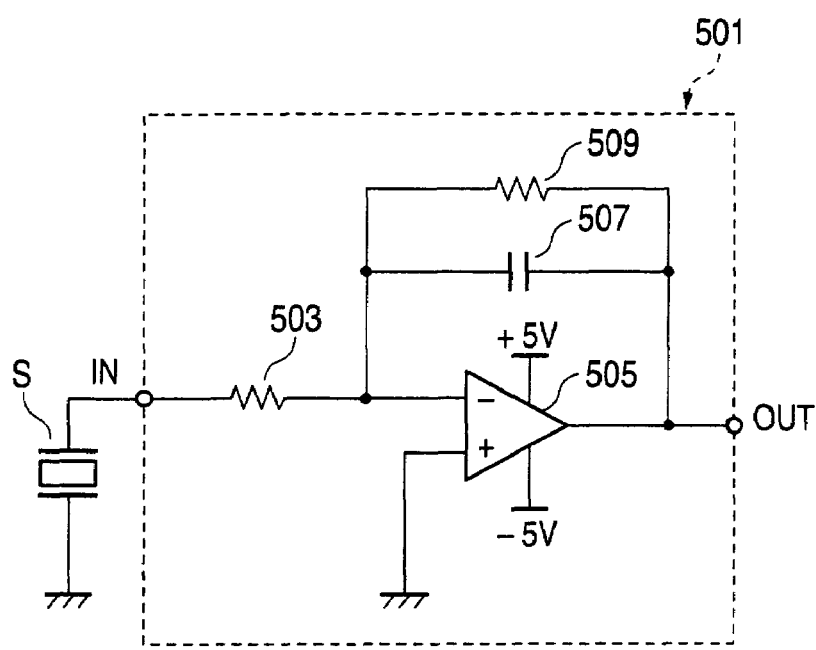
FIG. 17 is an electric circuit diagram showing the configuration of the conventional charge amplifier.

Although the embodiments have been described upon the case where a so-called plug-integrated pressure sensor (PGPS) integrally provided on the spark plug 23 is used as the piezoelectric pressure sensor S, there is no limit thereto. For example, the charge amplifier according to the present invention can be also applied to a washer type combustion pressure sensor (GPS) S' formed as a body separate from the spark plug as shown in FIG. 16, and the same effect can be obtained.

Incidentally, the washer type combustion pressure sensor S' is fixed between the mount seat of the spark plug and the engine 21 by clamping of the spark plug. In this state, the washer type combustion pressure sensor S' detects change of clamping load of the spark plug to thereby detect the in-cylinder pressure of the internal combustion engine. The washer type combustion pressure sensor S' includes a gasket 201 or the like for sealing between the mount seat of the spark plug and an engine head. The washer type combustion pressure sensor S'is configured 80 that electric charge generated in the piezoelectric element is output to the outside through a shielded wire 205.

Although the present invention has been described in detail and with reference to specific embodiments, it is obvious to those skilled in the art that various changes and modifications may be made without departing from the spirit and scope of the present invention.

This application is based on Japanese Patent Application (Japanese Patent Application 2000-367166) filed on Dec. 1, 2000, the contents of which are incorporated herein by reference.

The invention claimed is:

1. A charge amplifier for converting electric charge generated in a piezoelectric pressure sensor into a voltage signal, which comprises:
   an operational amplifier having an inverted input terminal connected to the other end of the piezoelectric pressure sensor having one end grounded wherein a coupling capacitor is provided between the inverted input terminal and the other end of the piezoelectric pressure sensor; and
   a feedback capacitor for connecting the inverted input terminal of the operational amplifier to an output terminal of the operational amplifier, wherein
   the operational amplifier is driven by a single power source, and
   an offset voltage is applied to a non-inverted input terminal of the operational amplifiers, and
   wherein capacitance of the coupling capacitor is not lower than capacitance of the piezoelectric pressure sensor.

2. The charge amplifier according to claim 1, wherein the operational amplifier uses an FET as an input portion.

3. The charge amplifier according to claim 1, wherein the piezoelectric pressure sensor is provided on a mount seat of a spark plug used in an internal combustion engine of an automobile and detects change of clamping load of the spark plug to thereby detect in-cylinder pressure of the internal combustion engine.

4. The charge amplifier according to claim 2, wherein the piezoelectric pressure sensor is provided on a mount seat of a spark plug used in an internal combustion engine of an automobile and detects change of clamping load of the spark plug to thereby detect in-cylinder pressure of the internal combustion engine.

* * * * *